June 10, 1924.                                                                    1,497,526
W. E. MARTIN
TINE FOR SIDE DELIVERY RAKES AND THE LIKE
Filed April 27, 1923
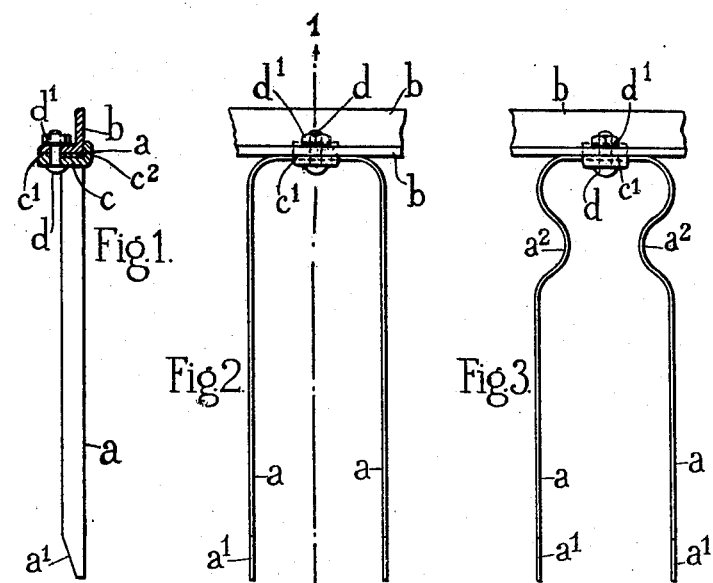
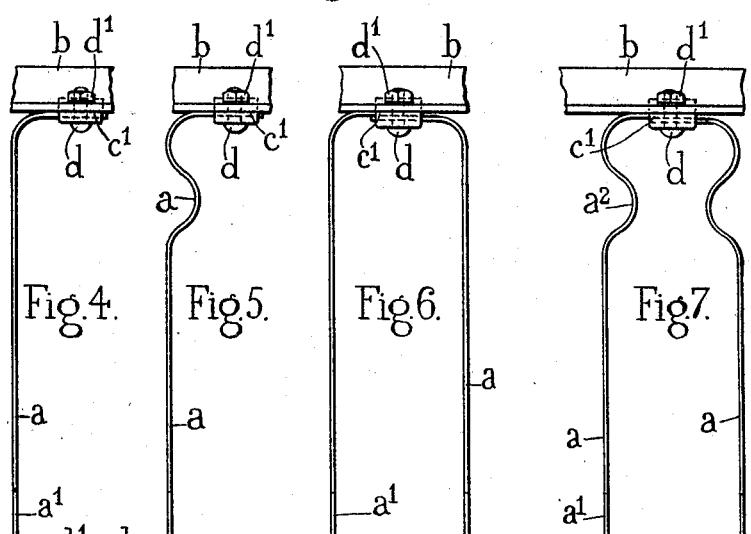
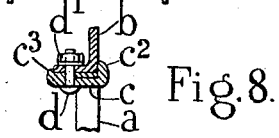
Inventor
William Edward Martin
by Knight Bro
Attorneys Patented June 10, 1924.

1,497,526

UNITED STATES PATENT OFFICE.

WILLIAM EDWARD MARTIN, OF STAMFORD, ENGLAND.

TINE FOR SIDE-DELIVERY RAKES AND THE LIKE.

Application filed April 27, 1923. Serial No. 635,030.

*To all whom it may concern:*

Be it known that I, WILLIAM EDWARD MARTIN, a subject of the King of Great Britain, residing at "Rock House," Scotgate, Stamford, in the county of Lincoln, England, have invented a new and useful Improvement in Tines for Side-Delivery Rakes and the like, of which the following is a specification.

This invention relates to side delivery rakes, swath turners and the like having rakes which rotate in a circular path with the tines controlled in a hanging position.

In such machines the tines are usually made from round steel wire and are provided at their upper ends with horizontal or vertical coils to provide the necessary resilience. Such tines are movable at their lower ends in all directions and if strained they may receive a permanent set. There is very little room to spare between the points of the tines and the following rake head in certain positions and if the tines are bent either forwards or backwards in the planes in which they rotate they come into contact with the said rake head and either break the machine or break the tines.

Tines have also been made from round steel wire and have been provided with springs to enable them to move in a fore and aft direction, but such tines are also liable to be bent. Tines for hand rakes have been made from sheet metal bent into a U-shape, but such tines have been made from metal which is so thick as to render them absolutely rigid.

The object of the present invention is to obviate this inconvenience. According to the present invention the tines are formed of narrow section flat spring metal having parallel edges and are arranged in planes at right-angles to the rake head or to the axis of rotation of the rakes. The tines are preferably cut off at an angle at their lower ends in order to sufficiently point the same.

The tines are connected to the rake head in any convenient manner.

The improved tines are rigid in a fore and aft direction, that is to say, in a vertical plane at right-angles to the rake head, but are flexible laterally in line with the rake heads. The natural flexibility of the metal may be increased by providing one or more curves near the upper end of each tine. Two tines may be constructed from a strip of sheet metal which has been bent into the form of an inverted U or the tines may be made separately by bending the upper end of a strip of metal around an arc leaving the extreme end at right-angles to the main portion thereof. Two of these last mentioned tines may be connected together to the rake head by a single clip or they may be connected separately to the rake head.

The invention is illustrated in the accompanying drawing in which Figure 1 is a vertical section on the line 1—1 of Figure 2. Figures 2, 3, 4, 5, 6 and 7 are front elevations showing portions of rake heads and tines fixed thereto. Figure 8 is a vertical section similar to Figure 1 but showing all parts in full lines.

As shown in Figure 2 two tines $a\ a$ may be constructed from a single strip of sheet spring metal having parallel edges and which is bent into the form of an inverted U. The tines $a$ are cut off at an angle at $a^1$ to point the same sufficiently. The two tines $a\ a$ are connected to the rake head $b$, by a clip consisting of a plate $c$ having a shallow lug $c^1$ behind the bolt $d$ and the tine $a$. The plate $c$ has also a longer lug $c^2$ to fit in front of the rake head $b$. The bolt $d$ passes through a perforation, in the plate $c$ and rake head $b$ and by means of a nut $d^1$ tightly clamps the tine $a$ between the plate $c$ and rake head $b$. The clip may also have a lug $c^3$ at the back of the rake head as shown.

The parts shown in Figures 1 and 2 are similar to those shown in Figure 3 except that in this latter figure the tines $a\ a$ are formed with curves $a^2$ near the upper end thereof.

The parts shown in Figures 4 and 5 correspond respectively with those shown in Figures 2 and 3 except that a single tine $a$ is connected separately to the rake head $b$.

In Figure 6 two separate tines $a\ a$ are shown connected by a single clip to the rake head $b$. Each tine is similar to that shown in Figure 4 except that one is slightly longer than the other so that their points are level. The clip shown in Figure 6 is slightly modified to accommodate the two thicknesses of metal between the plate $c$ and rake head $b$.

In Figure 7 the clip is similar to that shown in Figure 6 and the two tines $a\ a$ are similar to that shown in Figure 5 except that one is slightly longer so that their points are level.

What I claim as my invention is:—

1. An improved tine for side delivery rakes, swath turners and the like of that type in which the rakes rotate in a circular path with the tines controlled in a hanging position, said tine being made from a strip of narrow section flat spring metal having parallel edges and fixed in a plane at right-angles to the rake head substantially as set forth.

2. An improved rake for a side delivery rake, swath turner and the like having in combination a rake head, a tine made from a strip of narrow section flat spring metal having parallel edges and fixed in a plane at right-angles to the rake head, a clip, a bolt passing through perforations in the rake head and clip and a nut substantially as set forth.

3. An improved rake for a side delivery rake, swath turner and the like having in combination a rake head, a tine made from a strip of narrow section flat spring metal having parallel edges and fixed in a plane at right-angles to the rake head, a clip, a lug on the clip fitting behind the bolt and the tine, a second lug on the clip fitting in front of the rake head, a bolt passing through perforations in the rake head and clip and a nut substantially as set forth.

4. An improved rake for a side delivery rake, swath turner and the like having in combination a rake head, a tine having a curve near the upper part thereof made from a strip of narrow section flat spring metal having parallel edges and fixed in a plane at right-angles to the rake head, a clip, a lug on the clip fitting behind the bolt and the tine, a second lug on the clip fitting in front of the rake head, a bolt passing through perforations in the rake head and clip and a nut substantially as set forth.

5. An improved rake for a side delivery rake, swath turner and the like having in combination a rake head, two tines in the form of an inverted U made from a single strip of narrow section flat spring metal having parallel edges and fixed in a plane at right-angles to the rake head, a clip, a lug on the clip fitting behind the bolt and the tine, a second lug on the clip fitting in front of the rake head, a bolt passing through perforations in the rake head and clip and a nut substantially as set forth.

6. An improved rake for a side delivery rake, swath turner and the like having in combination a rake head, tines each made from a strip of narrow section flat spring metal having parallel edges and fixed in a plane at right-angles to the rake head, a clip securing two of said tines, a lug on the clip fitting behind the bolt and the tine, a second lug on the clip fitting in front of the rake head, a bolt passing through perforations in the rake head and clip and a nut substantially as set forth.

In witness whereof I have hereunto set my hand.

WILLIAM EDWARD MARTIN.